S. C. MacDOWNEY.
MEASURING INSTRUMENT.
APPLICATION FILED FEB. 14, 1918.
1,299,978.
Patented Apr. 8, 1919.
2 SHEETS—SHEET 1.
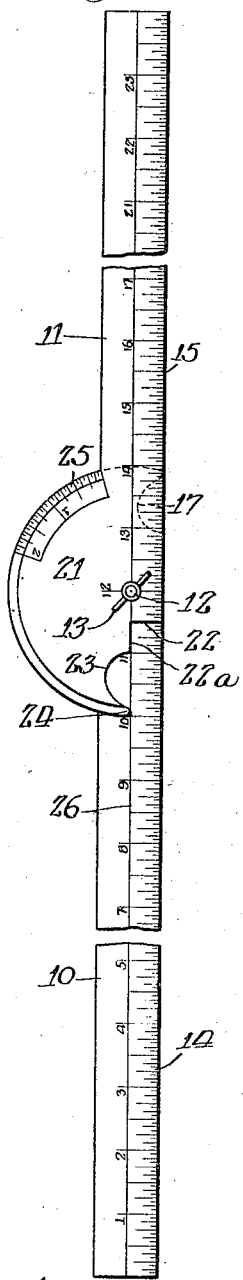
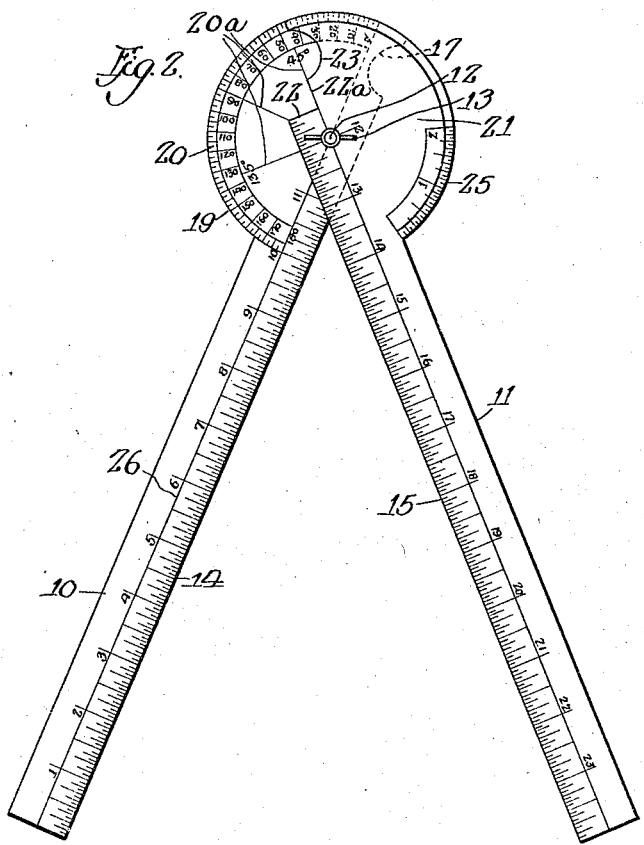
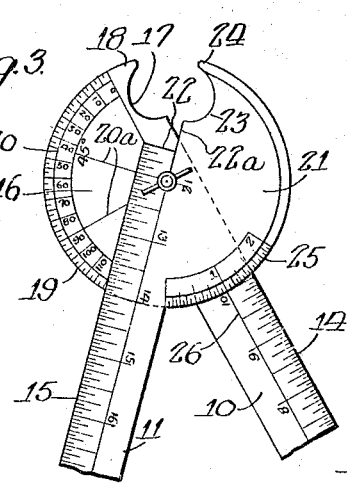
Inventor
Silas C. MacDowney
By Walter M. Fuller Atty.
Witness:

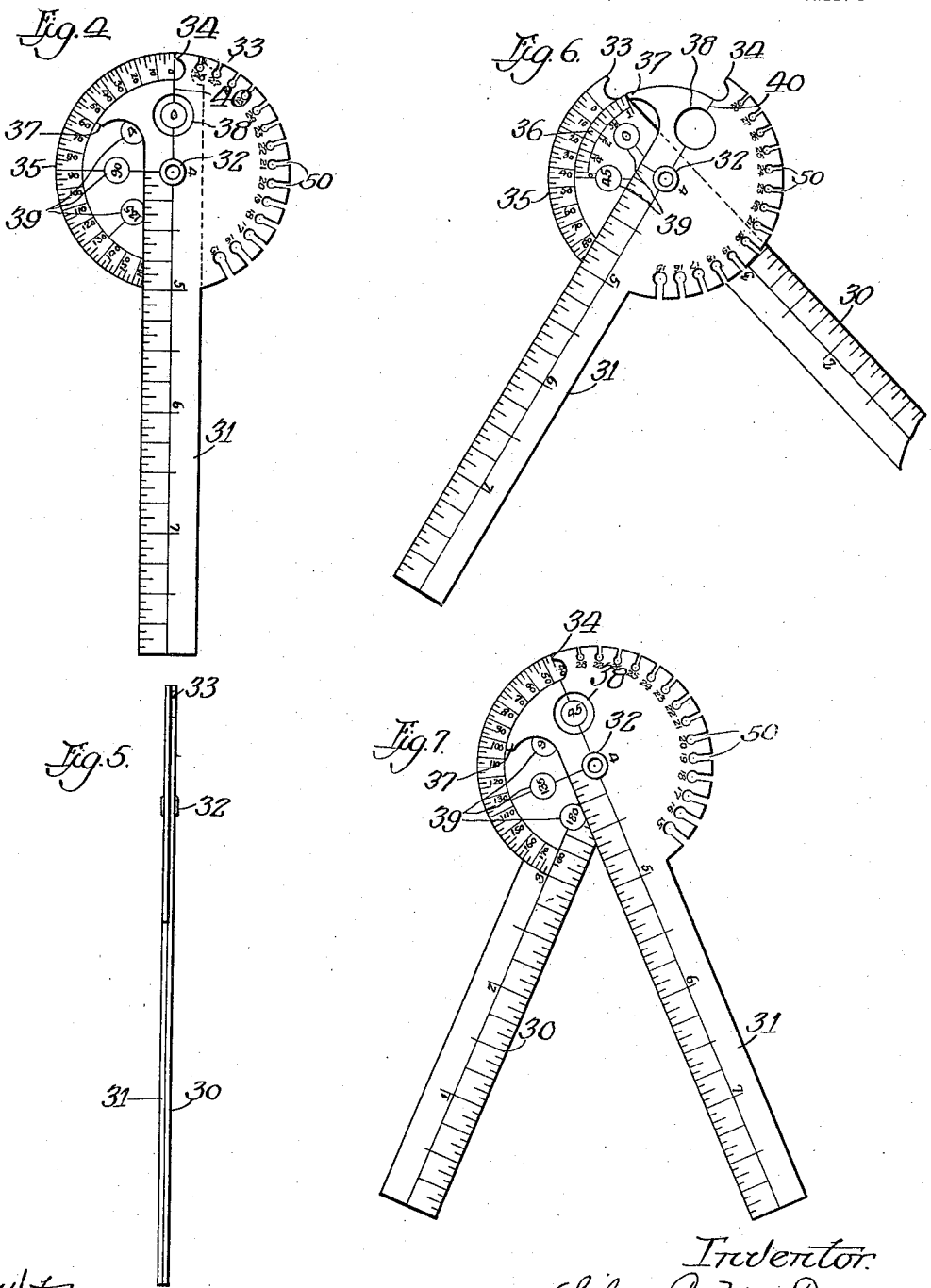

UNITED STATES PATENT OFFICE.

SILAS C. MacDOWNEY, OF CHICAGO, ILLINOIS.

MEASURING INSTRUMENT.

1,299,978.   Specification of Letters Patent.   Patented Apr. 8, 1919.

Application filed February 14, 1918. Serial No. 217,136.

*To all whom it may concern:*

Be it known that I, SILAS C. MACDOWNEY, a citizen of the United States, residing at Chicago, in the county of Cook and State of Illinois, have invented certain new and useful Improvements in Measuring Instruments, of which the following is a specification.

My present invention concerns measuring instruments and relates more specifically to a graduated appliance of this character adapted to measure angles and also to be used as a graduated pair of calipers, and in addition providing a straight scale or rule marked off in suitable units, such as inches and fractions thereof. A salient feature of the improved device resides in forming it of two members or bars hinged or pivoted together near one end, thus providing two long arms for measuring angles and two shorter arms for use as a pair of calipers, although, of course, this arrangement might in some instances be reversed to advantage. Another feature of the invention is the use of one of the caliper fingers as an index coöperating with a suitable scale to show the angle assumed by the arms when employed for determining an unknown angle or to indicate a definite angle when the angle meter is to be used in that way.

In order that those skilled in this art may have a full and complete understanding of this invention and its various advantages, I have illustrated in the accompanying drawings preferred embodiments, and throughout the various views of these drawings, like reference characters refer to the same parts.

In the drawings:

Figure 1 is a face view of the appliance in straightened condition to be used as a scale;

Fig. 2 shows the apparatus as employed for measuring angles;

Fig. 3 illustrates the manner of using the appliance as a pair of calipers;

Fig. 4 shows a modified construction in closed or folded relation;

Fig. 5 is an edge view of such device;

Fig. 6 shows the appliance opened for use as a pair of calipers; and

Fig. 7 illustrates the same appliance used as an angle meter.

Referring first to the appliance of Figs. 1 to 3 inclusive, it will be observed that the device includes two flat bars or members 10 and 11 fulcrumed or pivoted together at 12, the pivot pin having a winged clamp-nut 13 adapted to hold the two members in any determined angular relation. These two members may be brought into the straight position shown in Fig. 1, whereupon their two registering graduated edges 14 and 15 may be employed as an ordinary scale or rule. In other words, these two edges form a straight line or edge and the members may be locked or held in this relation by tightening the hand-nut 13. Such edges are graduated in suitable units, such as inches, and the scale on each forms a continuation or extension of the scale on the other. In this way, the graduations of the two supplement one another, forming a combination scale or rule suitably graduated from end to end.

At its inner or hinged end the scale member 14 has an enlargement 16 of general semi-circular form, but recessed at 17 to provide a terminal or end caliper finger 18. On its curved or semi-circular edge 19, such enlargement is graduated in angles at 20.

The corresponding inner edge of the companion bar 11 is similarly shaped at 21, being recessed at 22 and 23 leaving a thin end caliper finger 24 adapted, when the appliance is used as an angle meter, to ride over and coöperate with the angle scale graduations 20. As is clearly illustrated, the semi-circular edge of part 21 is partially graduated at 25 in suitable units, such as inches and fractions thereof, the reading on this scale being determined by the longitudinal line 26 on member 10, and conveniently, but not necessarily, constituting a portion of the scale thereon.

When the instrument is to be used as an angle meter, as illustrated in Fig. 2, the angle between the adjacent edges 14 and 15 of the scale members 10 and 11 may be determined by ascertaining the reading on the angle scale 20 indicated by the index 24, which, of course, under other conditions, constitutes one of the caliper elements. By opening or closing the members 10 and 11, that is, modifying their angular relation, until a desired angle is indicated on the scale, and then tightening the nut 13, the device may be made to have a temporarily permanent angle, which may be employed without disturbance so long as the nut is not loosened.

When the appliance is to be used as an outside pair of calipers, the members 10 and 11 are swung around so as to cross one another, as shown in Fig. 3. This brings the two fingers 18 and 24 into such separated, yet adjacent relation, that they may be used as a pair of calipers, their distance apart being read on scale 25 by means of the index line 26. If required, this caliper may be set for any amount and held in such relation by tightening nut 13.

If desired, the more prominent and more used angles of scale 20, such as 45°, 90°, and 135°, may be provided with radial lines 20ᵃ, and such angles read thereon by the edge 22ᵃ, these elements supplementing scale 20 and index finger 24 for quick setting of the appliance for these angles, without having recourse to the more or less finely-graduated angle-scale 20.

The instrument of Figs. 4 to 7 inclusive, is of the same general type as that of Figs. 1 to 3 inclusive, differing therefrom in minor details only as follows:

The two graduated scale members 30 and 31 are pivotally secured together by an eyelet 32 with sufficient friction to hold them from unintentional displacement, and at one end these parts are cut away to provide the coöperating caliper fingers 33 and 34. The curved edge portion of bar 30 has an angle scale 35 with which the caliper finger 34 coacts as an index or pointer, and inside of this scale is an inch or similar scale 36 with which a projecting index finger 37 coöperates to show the extent of opening of the caliper fingers. If desired the member 31, may be provided with a perforation or hole 38 therethrough, through which certain specific well known and frequently used angles displayed on member 30 may be read when in register therewith. To assist in this use of the instrument, member 31 may have an index line 40 for convenient association with the radial lines extending through the angle notations 39.

Inasmuch as the use and operation of this device is practically the same as that of the other, no detailed description thereof is required.

This invention is not restricted and limited to the precise and exact structural features presented, because these may be varied within comparatively wide limits without departure from the substance and essence of the invention and without the sacrifice of any of its substantial benefits and advantages.

In some cases it is desirable to provide the appliance with a wire or metal gage consisting of openings of predetermined definite sizes, the wire or metal sheet to be tested being tried in such openings until a proper fit is obtained. The reading adjacent to such opening gives the size of wire or the thickness of the sheet. Such a construction has been shown in a general way at 50 in Figs. 4, 5, 6, and 7, but it will be readily understood that such addition may be used equally well in connection with the appliance of Figs. 1, 2, and 3.

I claim:

1. In an instrument of the character described, the combination of two members only pivoted together near one end and constructed and adapted when crossed and opened one way to form a pair of calipers with a suitable linear scale to indicate the distance between the caliper jaws and when reversely crossed and opened to constitute a protractor with an angle scale with which one jaw of the calipers coacts to indicate the angular relation of the parts of the protractor, both scales being on the same side of the instrument, the space between said members when adjusted as a protractor up to one hundred and eighty degrees being unobstructed up to the apex of the angle, substantially as described.

2. In an instrument of the character described, the combination of two only relatively-straight members having substantially semi-circular end portions pivoted together, said members being constructed and adapted when crossed and opened one way to form a pair of calipers with a suitable linear measure scale on the semi-circular part of one of such members coacting with an index on the other member to indicate the distance between the caliper jaws and said members when reversely crossed and opened constituting a protractor with an angle scale on the other semi-circular part with which one jaw of the calipers coacts to indicate the angular relation of the parts of the protractor, both scales being on the same side of the instrument, the space between said members when adjusted as a protractor up to one hundred and eighty degrees being unobstructed up to the apex of the angle, substantially as described.

SILAS C. MacDOWNEY.

Copies of this patent may be obtained for five cents each, by addressing the "Commissioner of Patents, Washington, D. C."